United States Patent
Hyun

(10) Patent No.: US 9,644,719 B2
(45) Date of Patent: May 9, 2017

(54) STEP ACTUATOR

(71) Applicant: LG INNOTEK CO., LTD., Seoul (KR)

(72) Inventor: Woo Jin Hyun, Gwangju (KR)

(73) Assignee: LG INNOTEK CO., LTD., Seoul (KR)

( * ) Notice: Subject to any disclaimer, the term of this patent is extended or adjusted under 35 U.S.C. 154(b) by 316 days.

(21) Appl. No.: 14/448,660

(22) Filed: Jul. 31, 2014

(65) Prior Publication Data

US 2015/0020623 A1    Jan. 22, 2015

Related U.S. Application Data

(63) Continuation of application No. 14/039,961, filed on Sep. 27, 2013, now Pat. No. 8,826,757, which is a
(Continued)

(30) Foreign Application Priority Data

Oct. 14, 2008    (KR) .................. 10-2008-0100895

(51) Int. Cl.
*F16H 27/02*    (2006.01)
*F16H 29/02*    (2006.01)
(Continued)

(52) U.S. Cl.
CPC ............. *F16H 29/02* (2013.01); *F16H 27/02* (2013.01); *H02K 1/2733* (2013.01); *H02K 7/06* (2013.01);
(Continued)

(58) Field of Classification Search
CPC ....... F16H 29/02; F16H 27/02; H02K 1/2733; H02K 7/06; H02K 7/083; H02K 37/14
See application file for complete search history.

(56) References Cited

U.S. PATENT DOCUMENTS

| 3,356,874 A | 12/1967 | Chiapparelli et al. |
| 4,114,469 A | 9/1978 | Stratienko |

(Continued)

FOREIGN PATENT DOCUMENTS

| CN | 2845300 Y | 12/2006 |
| CN | 101127476 A | 2/2008 |

(Continued)

OTHER PUBLICATIONS

Extended European Search Report dated Oct. 18, 2016 in European Application No. 09820687.3.

*Primary Examiner* — David M Fenstermacher
(74) *Attorney, Agent, or Firm* — Saliwanchik, Lloyd & Eisenschenk

(57) ABSTRACT

A step actuator includes a housing, a stator in the housing, a rotor including a magnet provided radially inward of the stator and a nut member inserted into the magnet and protruding through one side of the housing, a bearing rotatably supporting the nut member, a screw member coupled with the nut member to linearly move as the rotor rotates, and a mounting member supported on one side of the housing to support the screw member in such a manner that the screw member is linearly movable. The nut member includes an end portion passing through the bearing and a coupling portion extending from the end portion to couple with the bearing.

6 Claims, 21 Drawing Sheets

Related U.S. Application Data continuation of application No. 13/124,235, filed as application No. PCT/KR2009/004344 on Aug. 4, 2009, now Pat. No. 8,567,272.

(51) Int. Cl.

| | | |
|---|---|---|
| *H02K 1/27* | (2006.01) | |
| *H02K 7/06* | (2006.01) | |
| *H02K 7/08* | (2006.01) | |
| *H02K 37/14* | (2006.01) | |
| *F16H 25/20* | (2006.01) | |

(52) U.S. Cl.
 CPC ............ *H02K 7/083* (2013.01); *H02K 37/14* (2013.01); *F16H 2025/2078* (2013.01); *Y10T 74/1508* (2015.01); *Y10T 74/18576* (2015.01); *Y10T 74/18664* (2015.01); *Y10T 74/19702* (2015.01)

(56) References Cited

U.S. PATENT DOCUMENTS

| | | | |
|---|---|---|---|
| 5,784,922 A | 7/1998 | Ozaki et al. | |
| 6,116,106 A | 9/2000 | Miyoshi | |
| 6,224,034 B1 | 5/2001 | Kato et al. | |
| 6,473,958 B2 | 11/2002 | Miyoshi et al. | |
| 6,857,332 B2 | 2/2005 | Pfister | |
| 6,882,073 B2 | 4/2005 | Suzuki et al. | |
| 7,047,833 B2 | 5/2006 | Durschmied | |
| 7,073,406 B2 | 7/2006 | Garrec | |
| 8,439,338 B2 | 5/2013 | Taniguchi et al. | |
| 8,567,272 B2 | 10/2013 | Hyun | |
| 8,601,952 B2 | 12/2013 | Tamai et al. | |
| 8,943,916 B2* | 2/2015 | Osterlaenger | B60G 7/006 192/223.4 |
| 2005/0275297 A1 | 12/2005 | Suzuki et al. | |
| 2006/0238050 A1 | 10/2006 | Matsushita et al. | |
| 2008/0006105 A1* | 1/2008 | Ko | A63B 22/02 74/89.23 |
| 2008/0130310 A1 | 6/2008 | Pfister | |
| 2008/0164784 A1 | 7/2008 | Huang | |
| 2009/0241706 A1* | 10/2009 | Yuta | B60G 7/003 74/89.23 |
| 2011/0132115 A1* | 6/2011 | Lee | H02K 5/161 74/89.37 |

FOREIGN PATENT DOCUMENTS

| | | |
|---|---|---|
| EP | 1890375 A2 | 2/2008 |
| JP | 62-117373 U | 7/1987 |
| JP | 01-198267 A | 8/1989 |
| JP | 03-011953 A | 1/1991 |
| JP | 4-505959 A | 10/1992 |
| JP | 08-266035 A | 10/1996 |
| JP | 10-322963 A | 12/1998 |
| JP | 2004-312821 A | 11/2004 |
| JP | 2005-168211 A | 6/2005 |
| KR | 10-2001-0064333 A | 7/2001 |
| KR | 20-0285091 Y1 | 8/2002 |
| KR | 10-2005-0061656 A | 6/2005 |
| KR | 10-2006-0029227 A | 4/2006 |
| KR | 10-2007-0030382 A | 3/2007 |
| KR | 10-2008-0015564 A | 2/2008 |
| WO | WO-99-43072 A1 | 8/1999 |
| WO | WO-2005057761 A1 | 6/2005 |

\* cited by examiner

STEP ACTUATOR

CROSS-REFERENCE TO RELATED APPLICATIONS

This application is a continuation of U.S. application Ser. No. 14/039,961, filed Sep. 27, 2013, which is a continuation of U.S. application Ser. No. 13/124,235, filed Apr. 18, 2011, now U.S. Pat. No. 8,567,272, issued Oct. 29, 2013, which is the U.S. national stage application of International Patent Application No. PCT/KR2009/004344, filed Aug. 4, 2009, which claims priority to Korean Patent Application No. 10-2008-0100895, filed Oct. 14, 2008, all of which are incorporated herein by reference in their entirety.

TECHNICAL FIELD

The embodiment relates to a step actuator.

BACKGROUND ART

A step actuator includes a rotor and a stator. The step actuator linearly drives a shaft according to rotation of the rotor.

For instance, the step actuator is connected to a member, which drives a reflector of a vehicle headlight system, in order to change the lighting direction. In addition, the step actuator converts the rotational movement of the rotor into the linear movement, so the step actuator can be applied to various electric and mechanical devices requiring the linear action.

DETAILED DISCLOSURE

Technical Problem

The embodiment provides a step actuator having a novel structure.

The embodiment provides a step actuator including a rotor having a novel structure.

The embodiment provides a step actuator in which a rotor is securely coupled with a bearing.

Technical Solution

According to the embodiment, a step actuator includes a housing, a stator in the housing, a rotor including a magnet provided radially inward of the stator and a nut member inserted into the magnet and protruding through one side of the housing, a bearing rotatably supporting the nut member, a screw member coupled with the nut member to linearly move as the rotor rotates, and a mounting member supported on one side of the housing to support the screw member in such a manner that the screw member is linearly movable. The nut member includes an end portion passing through the bearing and a coupling portion extending from the end portion to couple with the bearing.

According to the embodiment, a step actuator includes a housing, a stator in the housing, a magnet provided radially inward of the stator, a nut member inserted into the magnet and protruding through one side of the housing, a bearing rotatably supporting the nut member, a coupling member coupled with the nut member while interposing the bearing therebetween, a screw member coupled with the nut member to linearly move as the nut member rotates, and a mounting member supported on one side of the housing to support the screw member in such a manner that the screw member is linearly movable.

According to the embodiment, a step actuator includes a housing, a stator in the housing, a rotor including a magnet provided radially inward of the stator and a nut member inserted into the magnet and protruding through one side of the housing, a bearing provided outside the housing to rotatably support the nut member, a bearing cover coupled with the housing to support the bearing, a screw member coupled with the nut member to linearly move as the rotor rotates, and a mounting member coupled with the bearing cover to support the screw member in such a manner that the screw member is linearly movable.

Advantageous Effects

The embodiment can provide a step actuator having a novel structure.

The embodiment can provide a step actuator including a rotor having a novel structure.

The embodiment can provide a step actuator in which a rotor is securely coupled with a bearing.

BEST MODE FOR INVENTION

Figure 1:
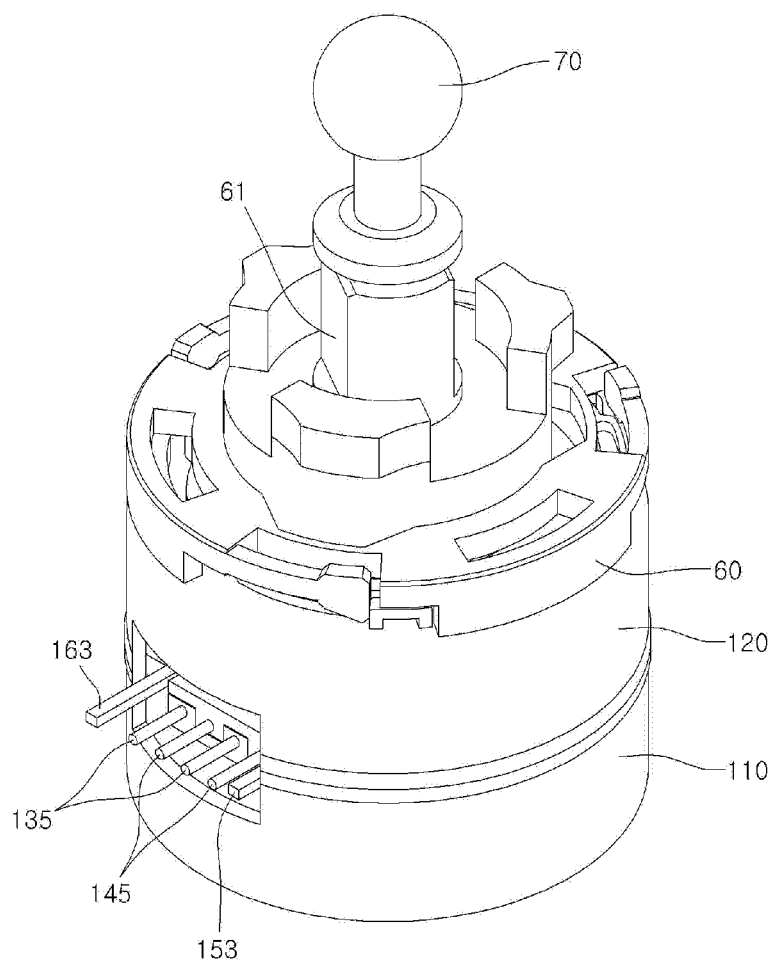
FIG. 1 is a perspective view showing a step actuator according to the embodiment.

Hereinafter, a step actuator according to the embodiment will be described in detail with reference to accompanying drawings.

The thickness and size of each layer shown in the drawings may be exaggerated, omitted or schematically drawn for the purpose of convenience or clarity. In addition, the size of elements does not utterly reflect an actual size.

Figure 2:
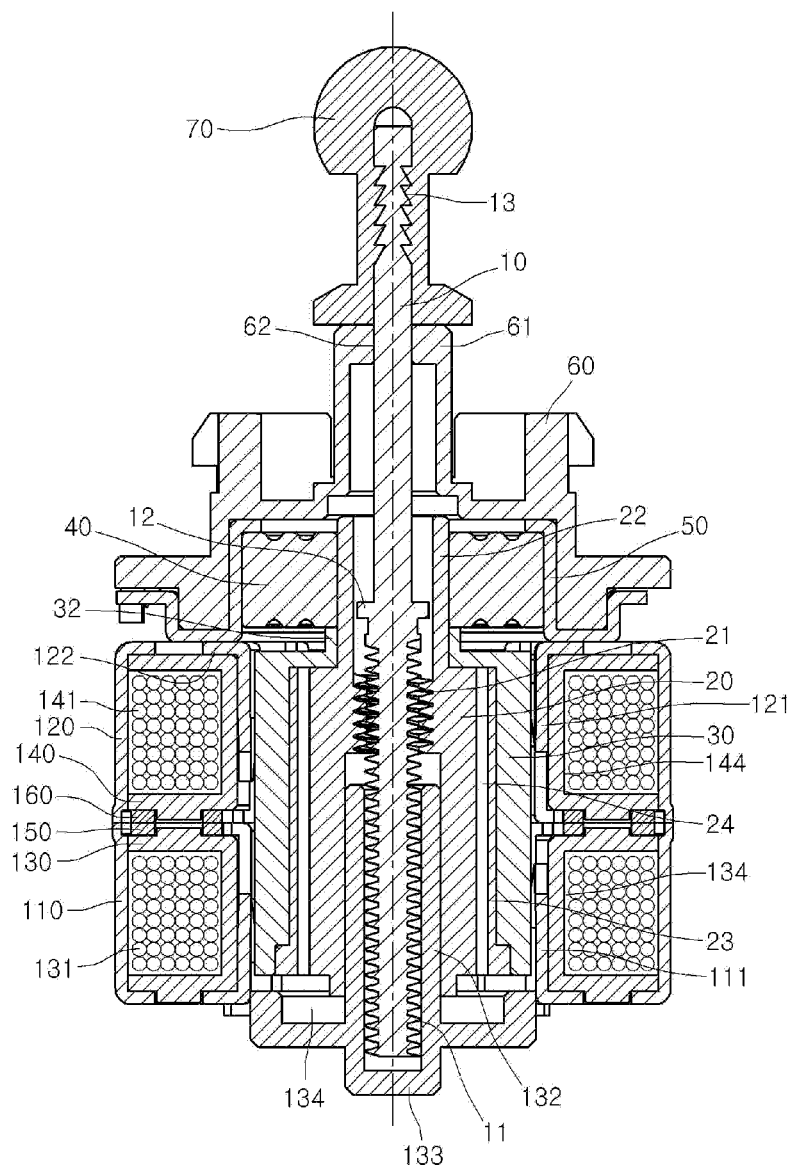
FIG. 2 is a sectional view showing the step actuator according to the embodiment.
Figure 3:
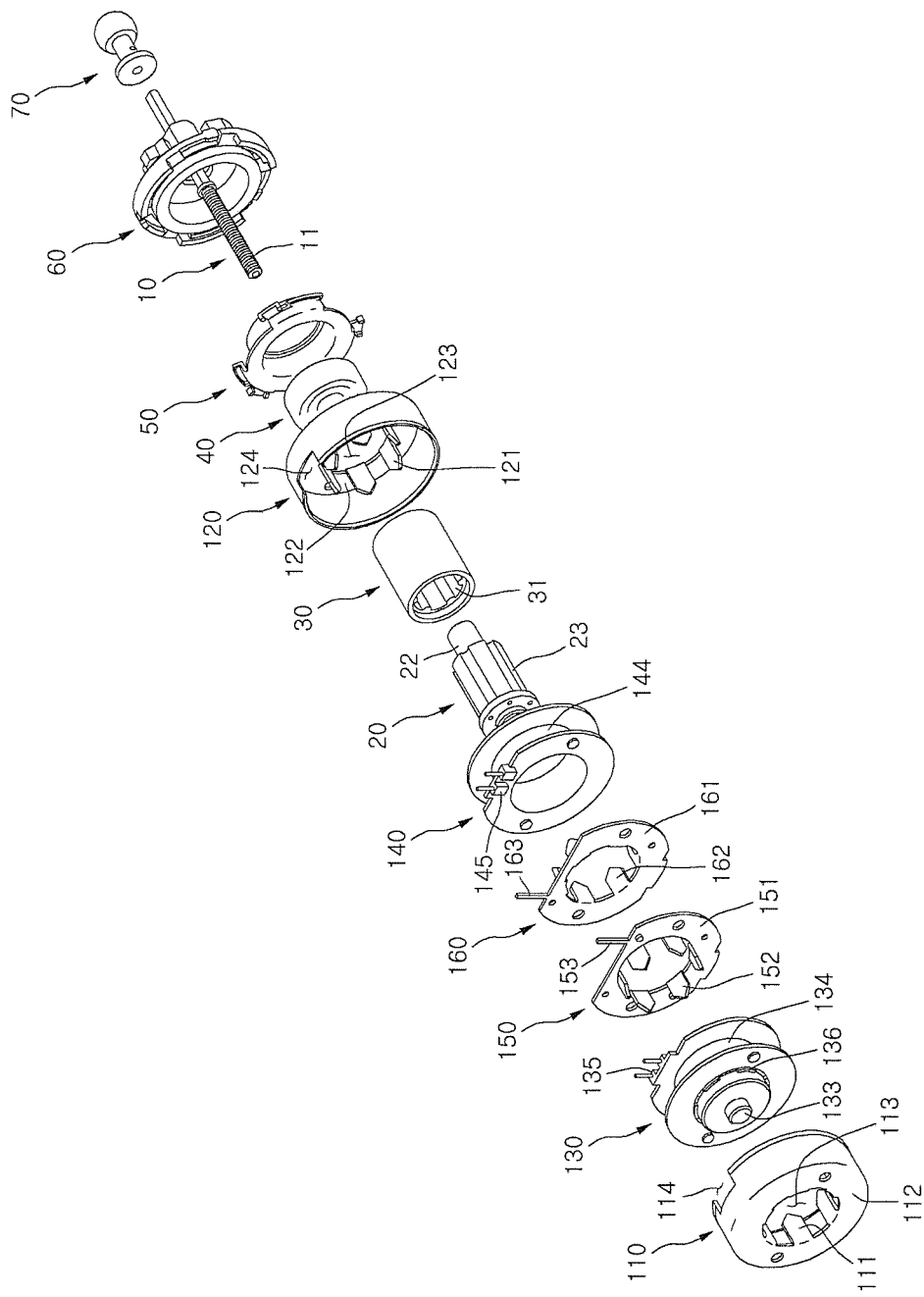
FIGS. 3 and 4 are exploded perspective views showing the step actuator according to the embodiment.
Figure 4:
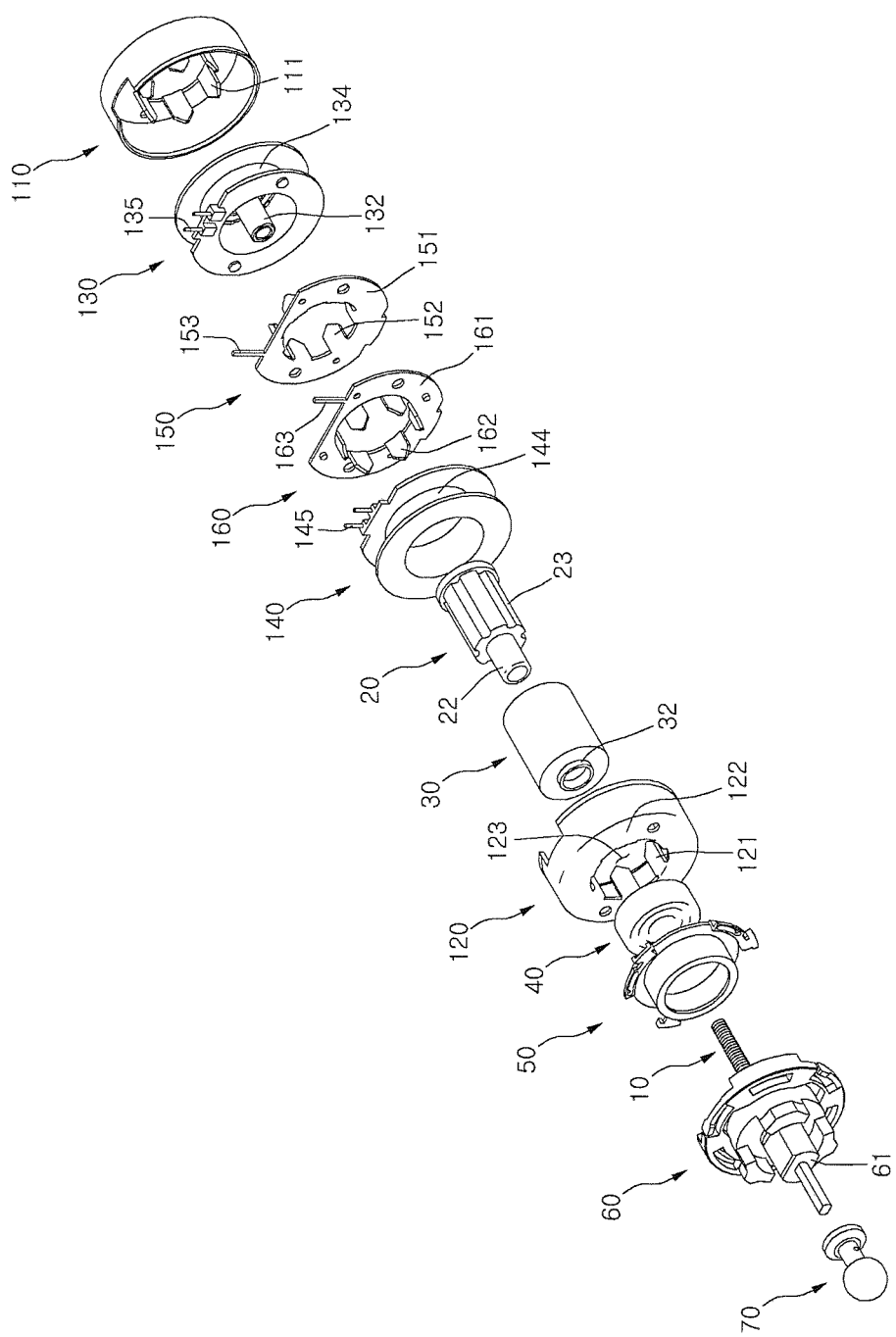

FIG. 1 is a perspective view showing a step actuator according to the embodiment, and FIG. 2 is a sectional view showing the step actuator according to the embodiment. FIGS. 3 and 4 are exploded perspective views showing the step actuator according to the embodiment.

Referring to FIGS. 1 to 4, the step actuator according to the embodiment includes a stator, a rotor that rotates while interacting with the stator, a screw member 10 coupled to the rotor to linearly reciprocate in first and second directions according to forward and reverse rotation of the rotor, and a joint 70 coupled to the screw member 10.

The stator includes first and second bobbins 130 and 130, and first and second yokes 150 and 160 interposed between first and second housings 110 and 120.

The rotor includes a magnet 30 installed inside the stator to rotate while interacting with the stator, and a nut member 20 coupled to the magnet 30.

The screw member 10 and the nut member 20 are coupled to each other in the form of a bolt-nut assembly. Accordingly, if the nut member 20 rotates, the screw member 10 linearly moves.

In detail, the first and second bobbins 130 and 130 are provided in a space formed between the first and second housing 110 and 120, and the first and second yokes 150 and 160 are provided between the first and second bobbins 130 and 130.

In addition, the magnet 30, the nut member 20 and the screw member 10 are provided radially inward in the first and second bobbins 130 and 130.

In addition, a bearing 40, a bearing cover 50, and a mounting member 60 are installed at one side of the second housing 120.

In more detail, as the step actuator according to the embodiment operates, the screw member 10 linearly reciprocates in the first and second directions, which are opposite to each other, along an axis of the screw member 10.

In addition, a first end of the screw member 10 is inserted into a protrusion pipe 132 of the first bobbin 130 and supported by the protrusion pipe 132. A second end of the screw member 10 passes through a protrusion 61 of the mounting member 60 while supporting the protrusion 61. A joint 70 is coupled to the second end of the screw member 10.

A thread 11 is formed on an outer circumferential surface of the first end of the screw member 10, and a stopper 12 is provided between the thread 11 and the second end of the screw member 10.

The thread 11 of the screw member 10 is coupled to a thread 21 formed on an inner circumferential surface of the nut member 20. Therefore, the screw member 10 moves in the first or second direction as the nut member 20 rotates.

The stopper 12 restrains the movement of the screw member 10 in the second direction. As the screw member 10 moves in the second direction, the stopper 12 is blocked by the protrusion 61 of the mounting member 60, so that the screw member 10 cannot move in the second direction any more. In addition, a blocking portion 133 is provided at a first end of the protrusion pipe 132 of the first bobbin 130 in order to restrain the movement of the screw member 10 in the first direction.

The movement of the screw member 10 in the second direction can be restrained by minimizing a diameter of a through hole 62 of the protrusion 61 of the mounting member 60 such that the thread 11 of the screw member 10 cannot pass through the protrusion 61 of the mounting member 60. Similarly, the movement of the screw member 10 in the first direction can be restrained by minimizing a diameter of the first end of the protrusion pipe 132 such that the thread 11 of the screw member 10 cannot pass through the protrusion pipe 132. Therefore, the blocking part 133 and the stopper 12 can be selectively provided according to designs.

Meanwhile, as described above, the screw member 10 can linearly move in the first or second direction by passing through the mounting member 60, but the rotation of the screw member 10 about the axis is restrained. That is, the rotation of the screw member 10 is restrained by the protrusion 61 of the mounting member 60.

For instance, the second end of the screw member 10 is cut into a shape of "D" and the through hole 62 of the mounting member 60 has a shape corresponding to a sectional shape of the second end of the screw member 10.

Therefore, since the screw member 10 cannot rotate, the screw member 10 linearly moves in the first or second direction as the nut member 20 coupled to the screw member 10 rotates As described above, the second end of the screw member 10 is coupled with the joint 70. The joint 70 may be coupled with various appliances to receive force transferred by the linear motion of the screw member 10. In this case, the appliances may be variously selected according to apparatuses employing the step actuator according to the embodiment.

The screw member 10 is provided therein with a groove 13 at the side of the second direction, and a portion of the joint 70 is buried in the groove 13. Accordingly, the screw member 10 can be securely coupled with the joint 70 in the axial direction.

For example, the groove 13 may be formed by performing a knurling process or a tapping process with respect to the screw member 10. The joint 70 is provided therein with a joint hole 71, and the screw member 10 having the groove 13 is inserted into the joint hole 71. If heat or an ultrasonic wave is applied to the joint 70 in a state that the screw member 10 is inserted into the joint hole 71, the joint 71 is melted, and the melted portion of the joint 71 is introduced into the groove 13. In this case, external force may be applied to the groove 13 such that the melted portion of the joint 70 is smoothly introduced into the groove 13.

Then, if the heat or the ultrasonic wave is removed, the joint 70 is hardened, so that the screw member 10 can be securely coupled with the joint 70.

The nut member 20 is inserted into the magnet 30 and a second end 22 of the nut member 20 protrudes in the second direction by passing through the magnet 30. A spline 23 is provided at an outer peripheral surface of the nut member 20 while extending in the axial direction and coupled with a spline hole 31 formed in the magnet 30.

The nut member 20 partially overlaps with the magnet 30 in the circumferential direction by the protrusion 23 and the spline hole 31, which are spline-coupled with each other. Accordingly, force applied in the circumferential direction due to the rotation of the magnet 30 is transferred to the nut member 20, and the nut member 20 rotates as the magnet 30 rotates.

For example, the protrusion 23 and the spline hole 31 may have a curved surface. In this case, the spline hole 31 of the magnet 30 may be easily processed.

The second end 22 of the nut member 20 is coupled with an inner race of the bearing 40. Thus, the nut member 20 can freely rotate while being supported by the bearing 40.

In addition, the thread 21 formed at the central portion of the inner circumferential surface of the nut member 20 is coupled with the thread 11 of the screw member 10. In addition, the nut member 20 is coupled with the protrusion pipe 132 of the first bobbin 130 at the inner circumferential surface provided at the side of the first direction and rotatably supported by the protrusion pipe 132 of the first bobbin 130. That is, the inner circumferential surface of the nut member 20 provided in the first direction makes contact with an outer circumferential surface of the protrusion pipe 132.

The magnet 30 may include a permanent magnet having N and S poles which are alternately aligned with each other in the circumferential direction at the regular interval. As described above, since the nut member 20 is inserted into the magnet 30, the nut member 20 rotates as the magnet 30 rotates.

Meanwhile, a second end 32 of the magnet 30 protrudes in the second direction to make contact with the inner race of the bearing 40. Accordingly, the magnet 30 can smoothly rotate without making contact with an outer race of the bearing 40 due to the second end 32 of the magnet 30.

The first bobbin 130 having a first coil 131 and the second bobbin 130 having a second coil 141 are installed around the magnet 30. In addition, the first and second yokes 150 and 160 are interposed between the first and second bobbins 130 and 130.

The first bobbin 130 includes a first coil winding portion 134, around which the first coil 131 is wound in a circumferential direction, and a first terminal portion 135 electrically connected to the first coil 131. Similarly, the second bobbin 130 includes a second coil winding portion 144, around which the second coil 141 is wound in the circumferential direction, and a second terminal portion 145 electrically connected to the second coil 141.

As described above, the first bobbin 130 has the protrusion pipe 132, into which the screw member 10 is inserted, and a slit 136, into which a third tooth 111 of the first housing 110 is inserted. The first bobbin 130 faces the magnet 30 and the nut member 20 in the first direction. The first bobbin 130 has a recess 134 recessed in the first direction to reduce friction among the first bobbin 130, the magnet 30 and the nut member 20 as the magnet 30 and the nut member 20 move in the first or second direction.

The first yoke 150 includes a first body portion 151 having a ring shape, a first tooth 152 protruding from an inner peripheral surface of the first body portion 151 toward the first housing 110 to be interposed between the first bobbin 130 and the magnet 30, and a first grounding terminal 153 to ground the first body portion 151. In addition, the second yoke 160 includes a second body portion 161 having a ring shape, a second tooth 162 protruding from an inner peripheral surface of the second body portion 161 toward the second housing 120 to be interposed between the second bobbin 130 and the magnet 30, and a second grounding terminal 163 to ground the second body portion 161.

Meanwhile, the first housing 110 is provided with the third tooth 111 protruding toward the second housing 120 to be interposed between the first bobbin 130 and the magnet 30 by passing through the slit 136 of the first bobbin 130. The third tooth 111 and the first tooth 152 are alternately aligned with each other along an outer peripheral portion of the magnet 30.

The first housing 110 has a first rim portion 112, which protrudes radially inward of the cylindrical body of the first housing 110, and the third tooth 111 extends from the first rim portion 112 in the second direction. A first opening 113 is defined by the first rim portion 112 and one side of the first bobbin 130 is inserted into the first opening 113.

In addition, the second housing 120 has a fourth tooth 121 protruding toward the first housing 110 to be interposed between the second bobbin 130 and the magnet 30. The fourth tooth 121 and the second tooth 162 are alternately aligned with each other along an outer peripheral portion of the magnet 30.

The second housing 120 has a second rim portion 122, which protrudes radially inward of the cylindrical body of the second housing 120, and the fourth tooth 121 extends from the second rim portion 122 in the first direction.

Meanwhile, a first cutting portion 114 is formed in the first housing 110 by cutting a predetermined portion of the first rim portion 112, and a second cutting portion 124 is formed in the second housing 120 by cutting a predetermined portion of the second rim portion 122. The first and second rim sections 114 and 124 define an opening allowing the first terminal portion 135 formed in the first bobbin 130, the first grounding terminal 153 formed in the first yoke 150, a second grounding terminal 163 formed in the second yoke 160, and the second terminal portion 145 formed in the second bobbin 130 to protrude outward through the opening.

The bearing 40 is installed at the second end of the second housing 120, and the bearing cover 50 is provided to support the bearing 40. That is, the bearing cover 50 is coupled to the second housing 120 to restrain the bearing 40. For instance, the bearing cover 50 can be coupled with the second housing 120 through a spot welding scheme or a laser welding scheme.

As described above, the inner race of the bearing 40 is coupled with the second end 22 of the nut member 20 and supported by the second end 22 of the nut member 20.

In addition, the movement of the bearing 40 in the first direction is restrained by the second rim portion 122 of the second housing 120, and the movement of the bearing 40 in the second direction is restrained by the bearing cover 50.

The diameter of a second opening 123 defined by the second rim portion 122 is greater than that of the magnet 30 and smaller than that of the bearing 40. Accordingly, friction may not occur between the magnet 30 and the second housing 120 and the movement of the bearing 40 in the first direction can be restrained.

Figure 5:
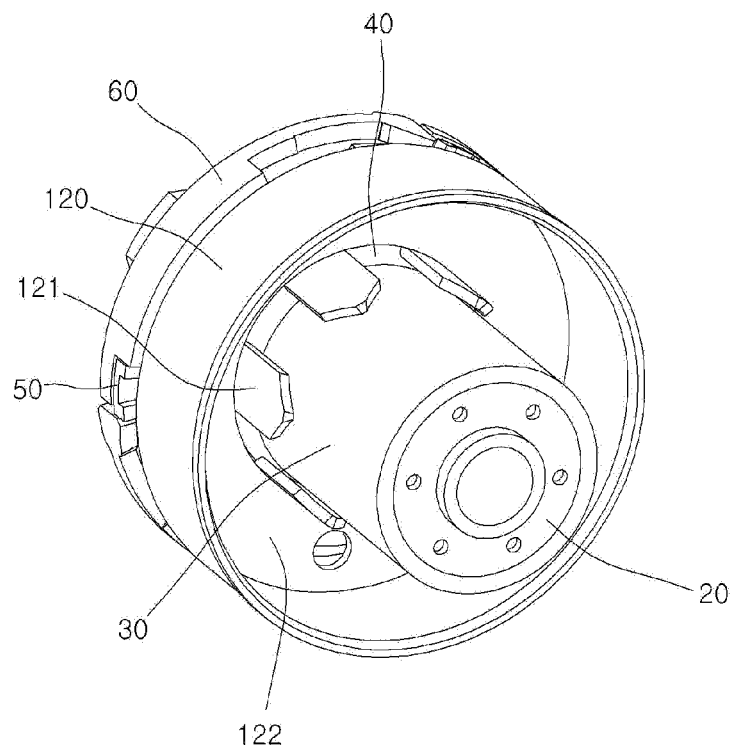
FIG. 5 is a perspective view showing the second housing that supports the bearing in the first direction in the step actuator according to the embodiment.

FIG. 5 is a perspective view showing the second housing that supports the bearing in the first direction in the step actuator according to the embodiment.

Referring to FIG. 5, the nut member 20 is inserted into the magnet 30 and is coupled with the inner race of the bearing 40.

The bearing cover 50 is coupled with the second housing 120 in the second direction, and the mounting member 60 is coupled with the bearing cover 50 in the second direction.

The bearing 40 is interposed between the bearing cover 50 and the second housing 120. The movement of the bearing 40 in the first direction is restrained by the second rim portion 122 of the second housing 120.

Referring to FIG. 5, the bearing 40 is partially exposed between the second rim portion 122 and the magnet 30, and the remaining part of the bearing 40 is blocked by the second rim portion 122 of the second housing 120 so that the movement of the bearing 40 in the first direction can be restrained.

Figure 6:
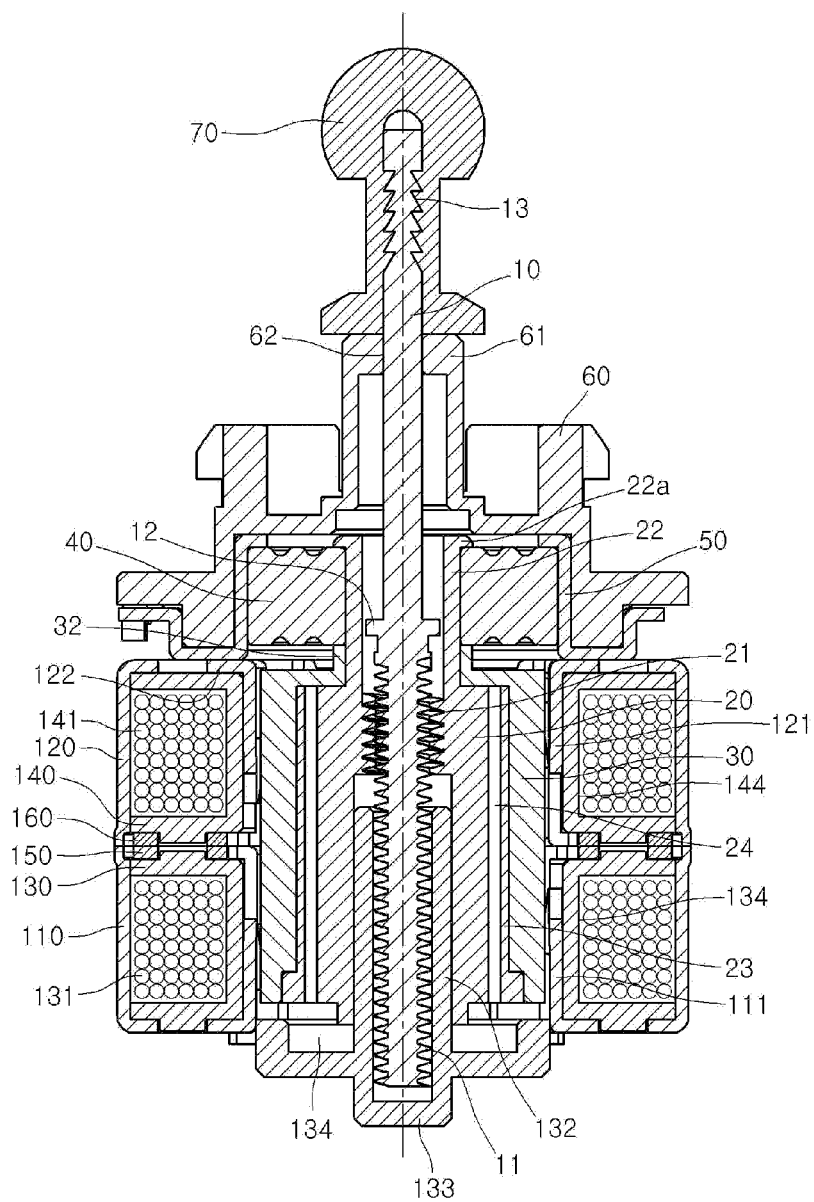
FIGS. 6 to 10 are views showing the coupling structure of a rotor and a bearing in a step actuator according to a first embodiment.
Figure 23:
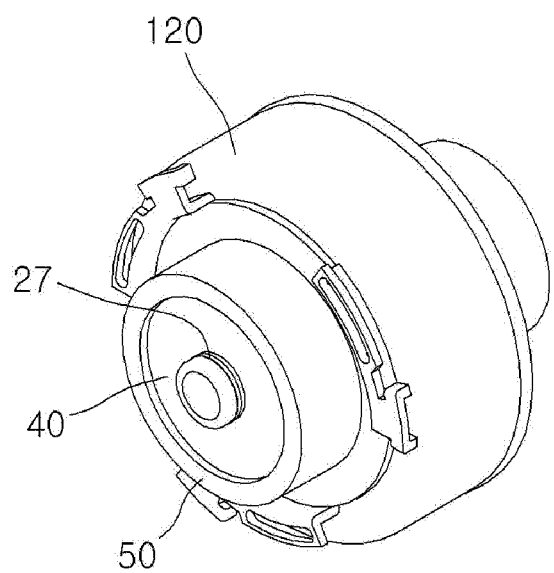
Figure 24:
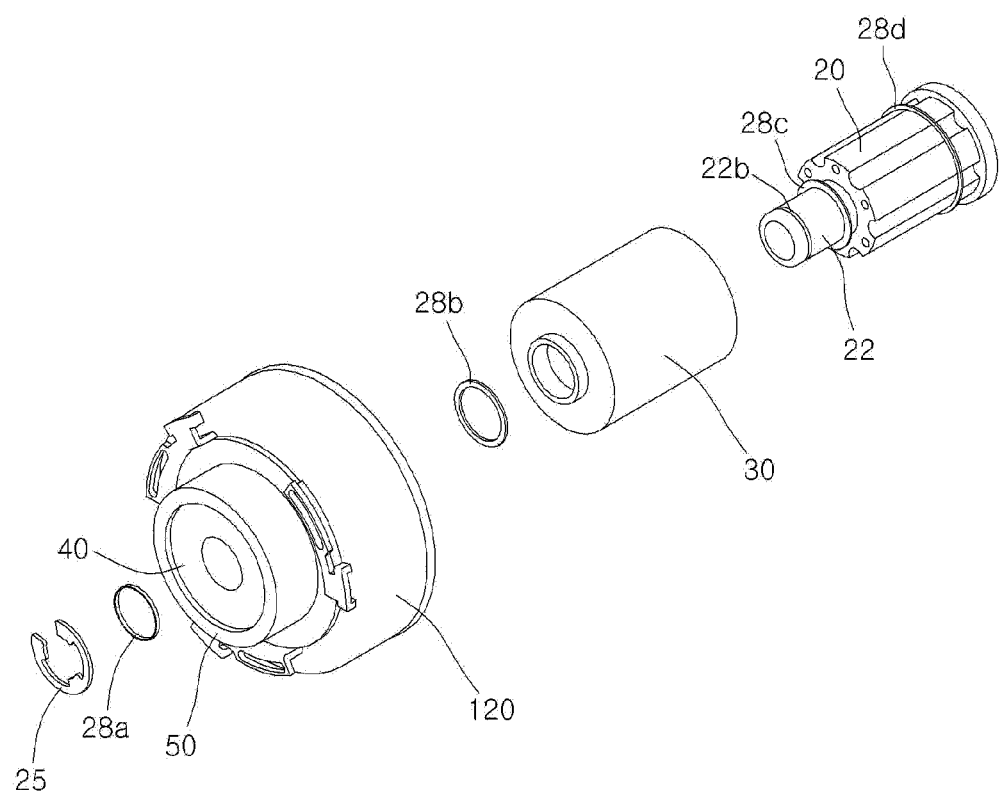
FIG. 24 is a view showing the use of an elastic member in order to securely couple the rotor with the bearing in the step actuator according to the embodiments.

FIGS. 6 and 24 are views showing the coupling structure of a rotor and a bearing in a step actuator according to other embodiments. Hereinafter, the embodiments shown in FIGS. 6 to 24 will be described while focusing on only the coupling structure of the rotor and the bearing, and the structure and components identical to those of FIGS. 1 to 5 will be not further described in order to avoid redundancy.

In the following description, coupling sections and coupling members are used to securely couple the bearing 40, the magnet 30, and the nut member 120 with each other. The coupling portion may be realized in the form of a coupling portion 22a or a hook portion 22c, and the coupling member may be realized in the form of a snap ring 25, a nut member stopper 26, and a bush 27.

FIGS. 6 to 10 are views showing the coupling structure of a rotor and a bearing in a step actuator according to a first embodiment.

Figure 7:
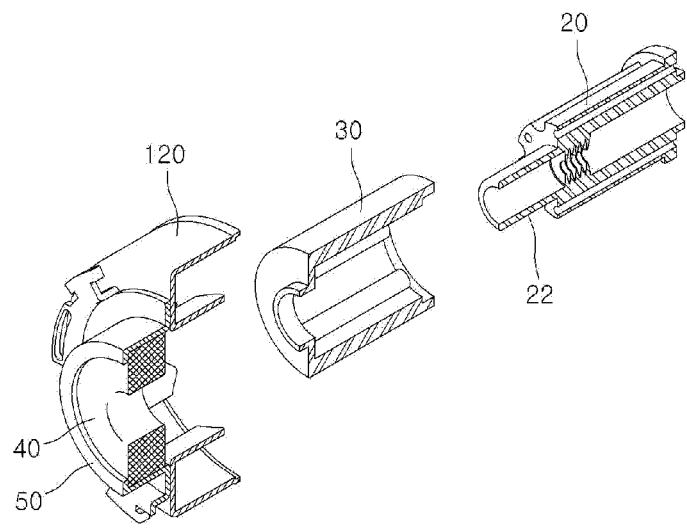
Figure 8:
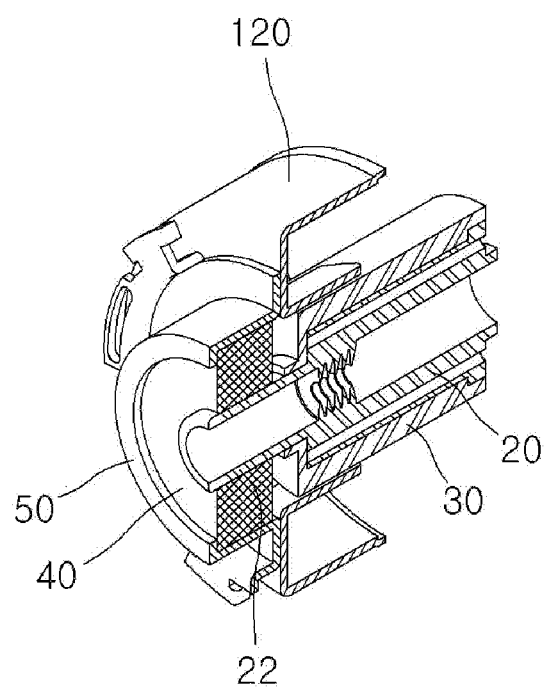

Referring to FIGS. 6, 7, and 8, the second end 22 of the nut member 10 protrudes through the bearing 40 in the second direction. The outer peripheral portion of the second end 22 of the nut member 20 is coupled with the inner race of the bearing 40 while making contact with the inner race of the bearing 40.

Figure 9:
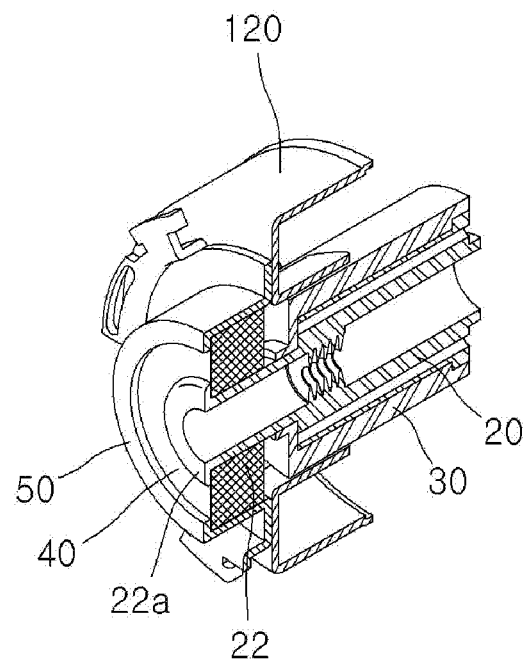
Figure 10:
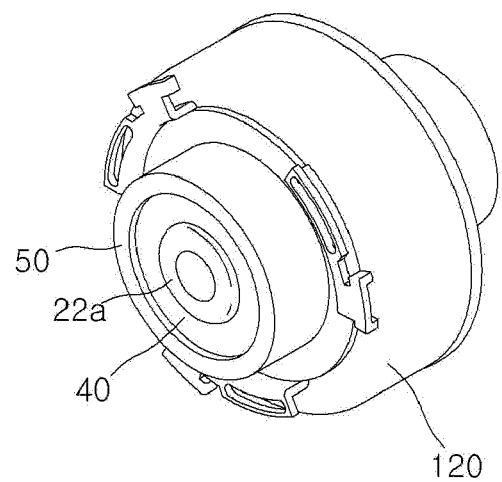

Referring to FIGS. 6, 9, and 10, after applying heat or an ultrasonic wave to a protrusion of the second end 22 of the nut member 20, the protrusion is subject to the swaging process, thereby forming the bearing coupling portion 22a coupled with the inner race of the bearing 40 at the side of the second direction while making contact with the inner race of the bearing 40.

Therefore, the bearing 40, the magnet 30, and the nut member 20 can be securely coupled with each other, and the bearing 40 can support the magnet 30 and the nut member 30 such that the magnet 30 and the nut member 20 can smoothly rotate.

FIGS. 11 to 14 are views showing the coupling structure of a rotor and a bearing in a step actuator according to a second embodiment.

Figure 11:
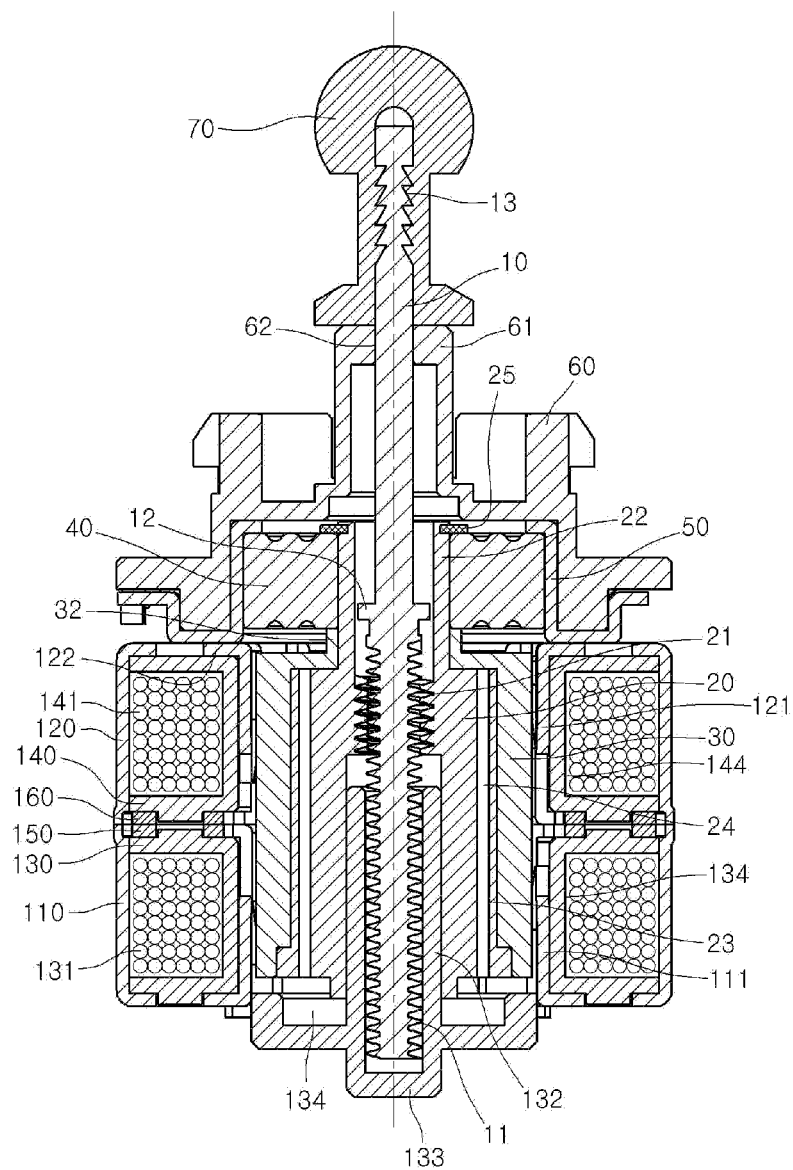
FIGS. 11 to 14 are views showing the coupling structure of a rotor and a bearing in a step actuator according to a second embodiment.
Figure 12:
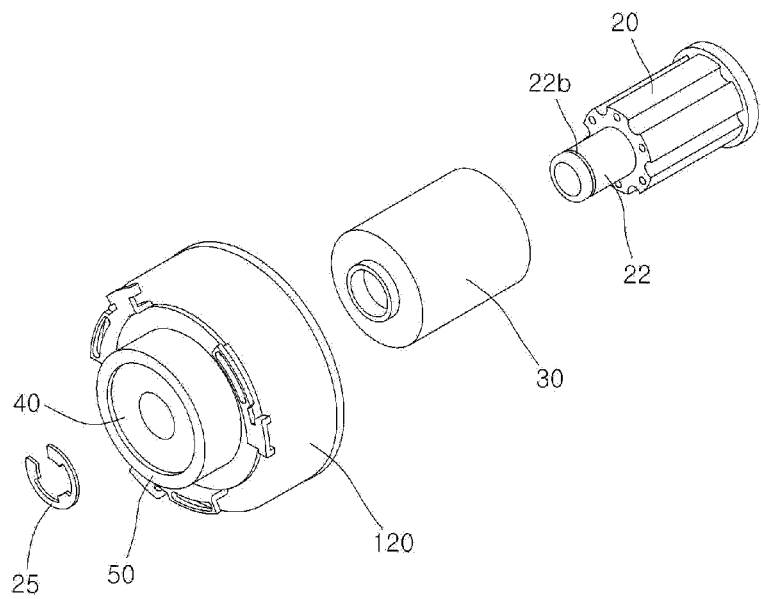
Figure 13:
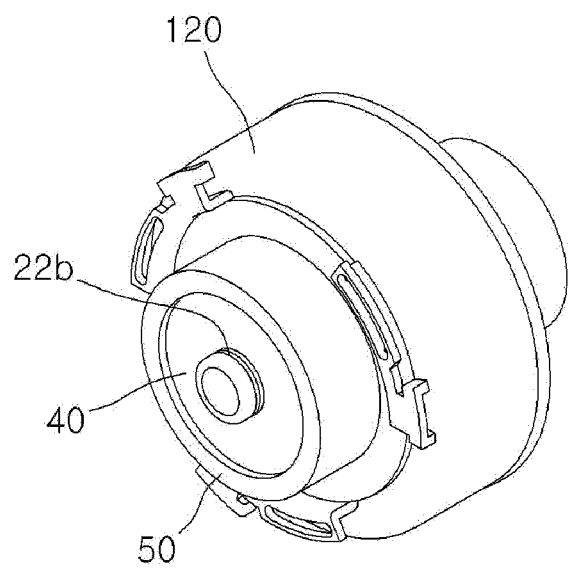

Referring to FIGS. 11, 12, and 13, a coupling groove 22b is formed in the second end 22 of the nut member 20 in a circumferential direction of the second end 22. The snap ring 25 is provided at the side of the second direction of the bearing 40.

When the bearing 40, the magnet 30, and the nut member 20 are coupled with each other, the second end 22 of the nut member 20 protrudes through the bearing 40 in the second direction, and the coupling groove 22b of the nut member 20 is exposed in the second direction.

Figure 14:
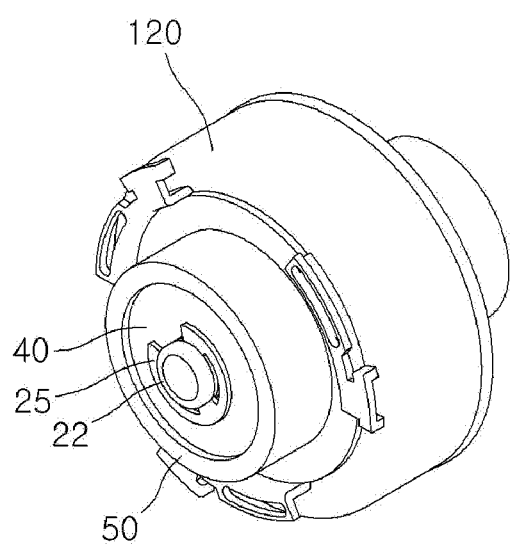

Referring to FIGS. 11 and 14, the snap ring 25 is inserted into the coupling groove 22b, so that the bearing 40 is restrained at the side of the second direction. The snap ring 25 is coupled with the coupling groove 22b, and makes contact with the inner race of the bearing 40 at the side of the second direction.

Therefore, the bearing 40, the magnet 30, and the nut member 20 can be securely coupled with each other by the coupling groove 22b and the snap ring 25, and the bearing 40 can support the magnet 30 and the nut member 30 such that the magnet 30 and the nut member 20 can smoothly rotate.

Figure 15:
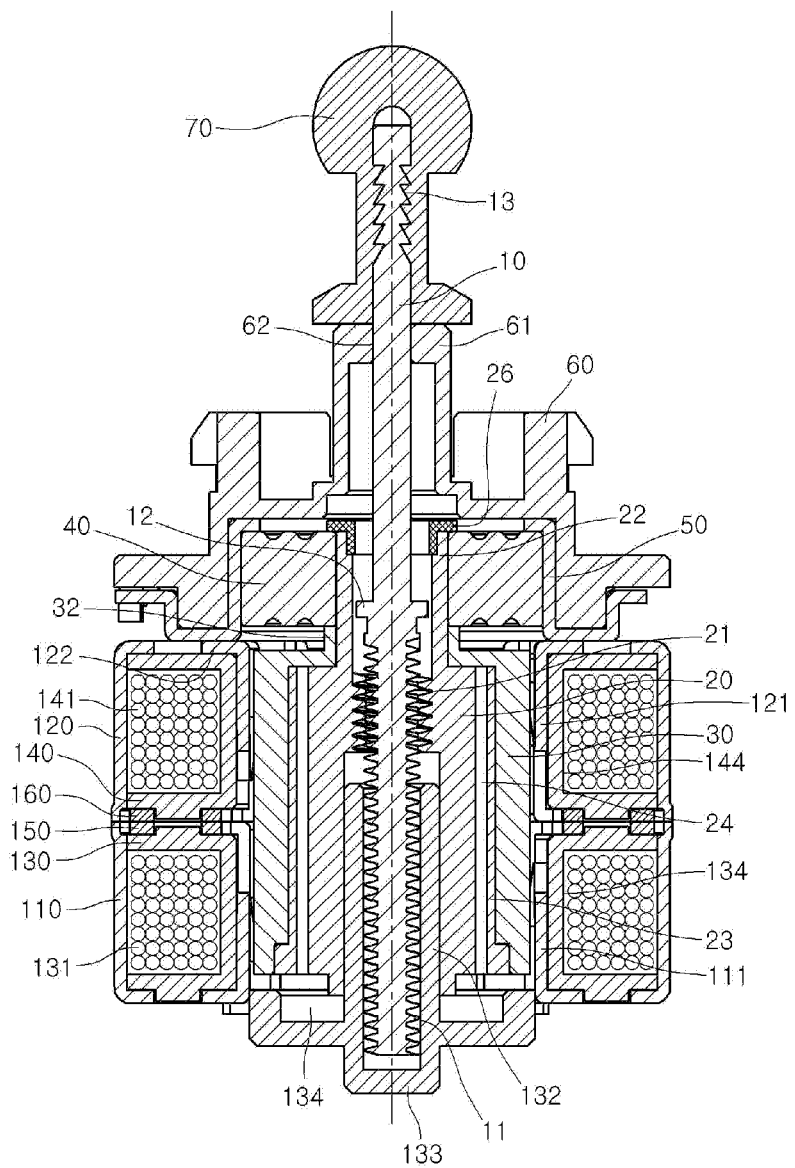
FIGS. 15 to 17 are views showing the coupling structure of a rotor and a bearing in a step actuator according to a second embodiment.
Figure 16:
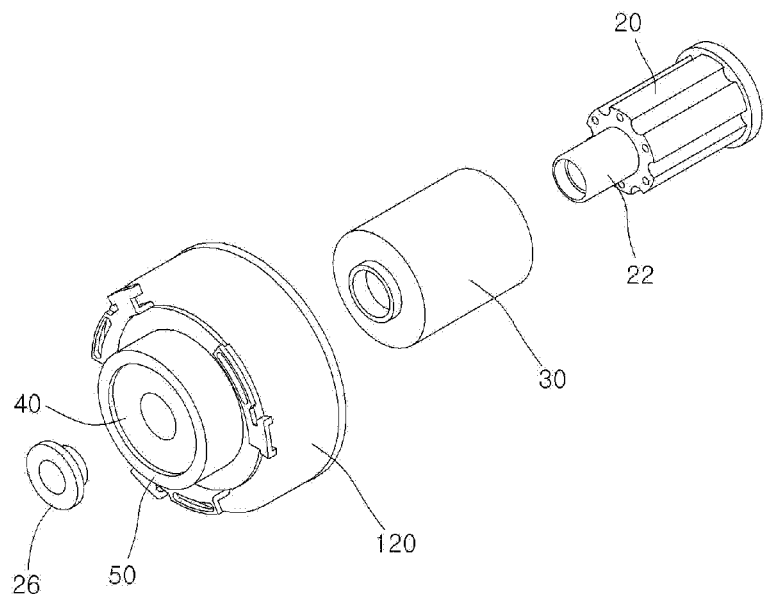
Figure 17:
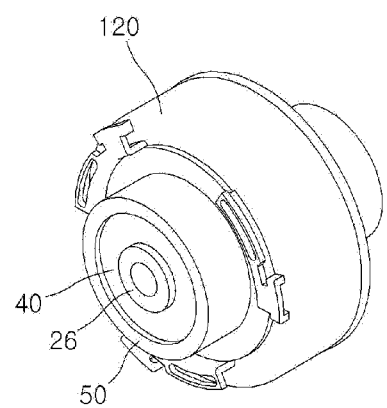

FIGS. 15 to 17 are views showing the coupling structure of a rotor and a bearing in a step actuator according to a second embodiment.

Referring to FIGS. 15 to 17, a nut member stopper 26 is provided at a second end of the bearing 40 and coupled with the nut member 22 at the side of the second direction.

The nut member stopper 26 makes contact with the inner race of the bearing 40 at the side of the second direction. A portion of the nut member stopper 26 protrudes in the first direction and is inserted into the nut member 22.

An outer circumferential surface of the nut member stopper 26 is coupled with an inner circumferential surface of the nut member 22 while making contact with the inner circumferential surface of the nut member 22. Although not shown, the nut member stopper 26 may be provided at the central portion thereof with a through hole, so that the screw member 10 can pass through the nut member stopper 26.

Therefore, the bearing 40, the magnet 30, and the nut member 20 can be securely coupled with each other by the nut member stopper 26, and the bearing 40 can support the magnet 30 and the nut member 30 such that the magnet 30 and the nut member 20 can smoothly rotate.

Figure 18:
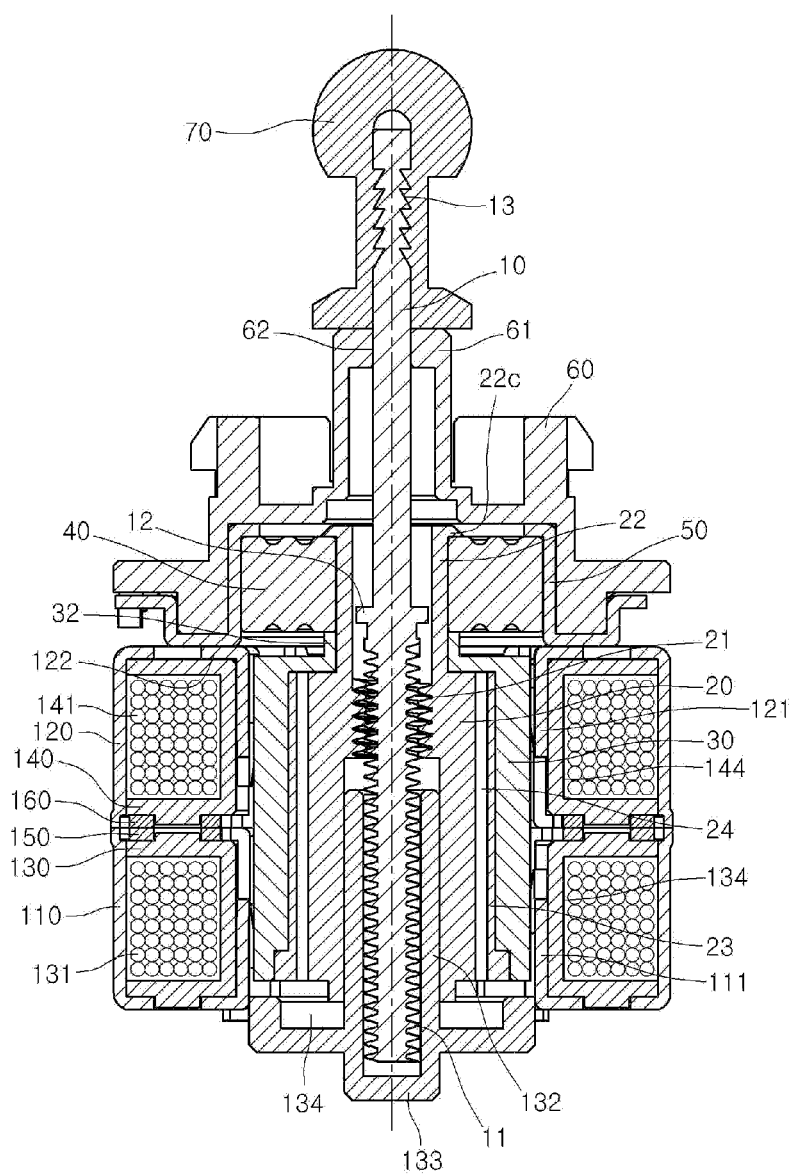
FIGS. 18 to 20 are views showing the coupling structure of a rotor and a bearing in a step actuator according to a fourth embodiment.
Figure 19:
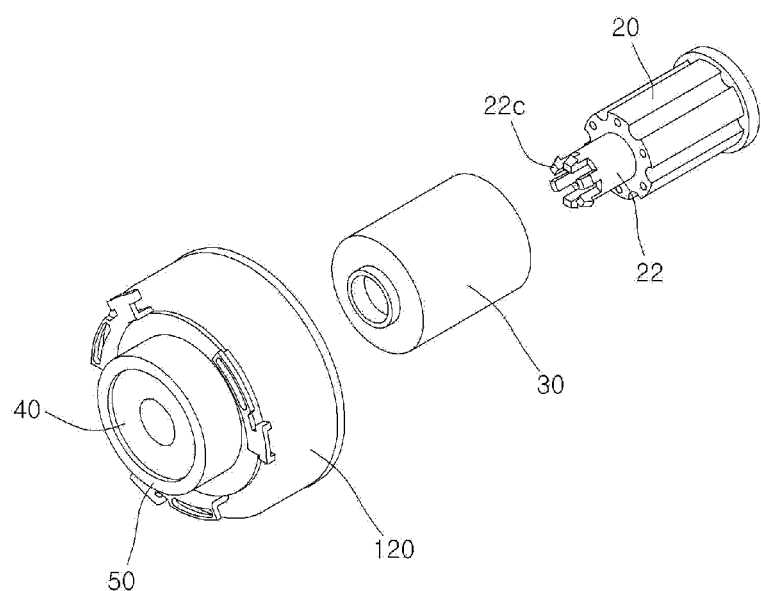
Figure 20:
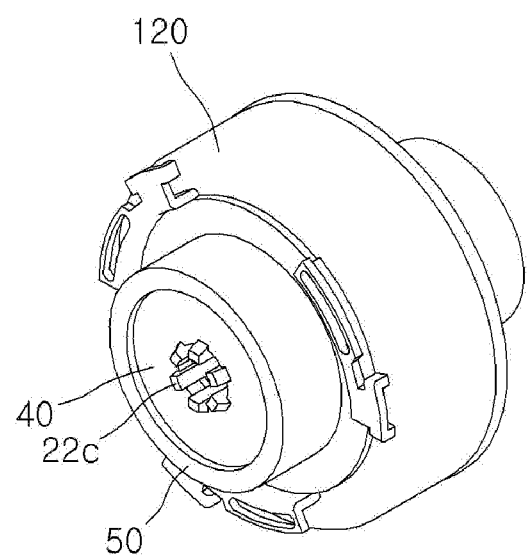

FIGS. 18 to 20 are views showing the coupling structure of a rotor and a bearing in a step actuator according to a fourth embodiment.

Referring to FIGS. 18 to 20, the hook portion 22c is provided in the second end 22 of the nut member 20. The hook portion 22c makes contact with the second end of the bearing 40 through the bearing 40. In other words, the hook portion 22c of the nut member 20 is coupled with the inner race of the bearing 40.

Therefore, the bearing 40, the magnet 30, and the nut member 20 can be securely coupled with each other by the hook portion 22c, and the bearing 40 can support the magnet 30 and the nut member 30 such that the magnet 30 and the nut member 20 can smoothly rotate.

Figure 21:
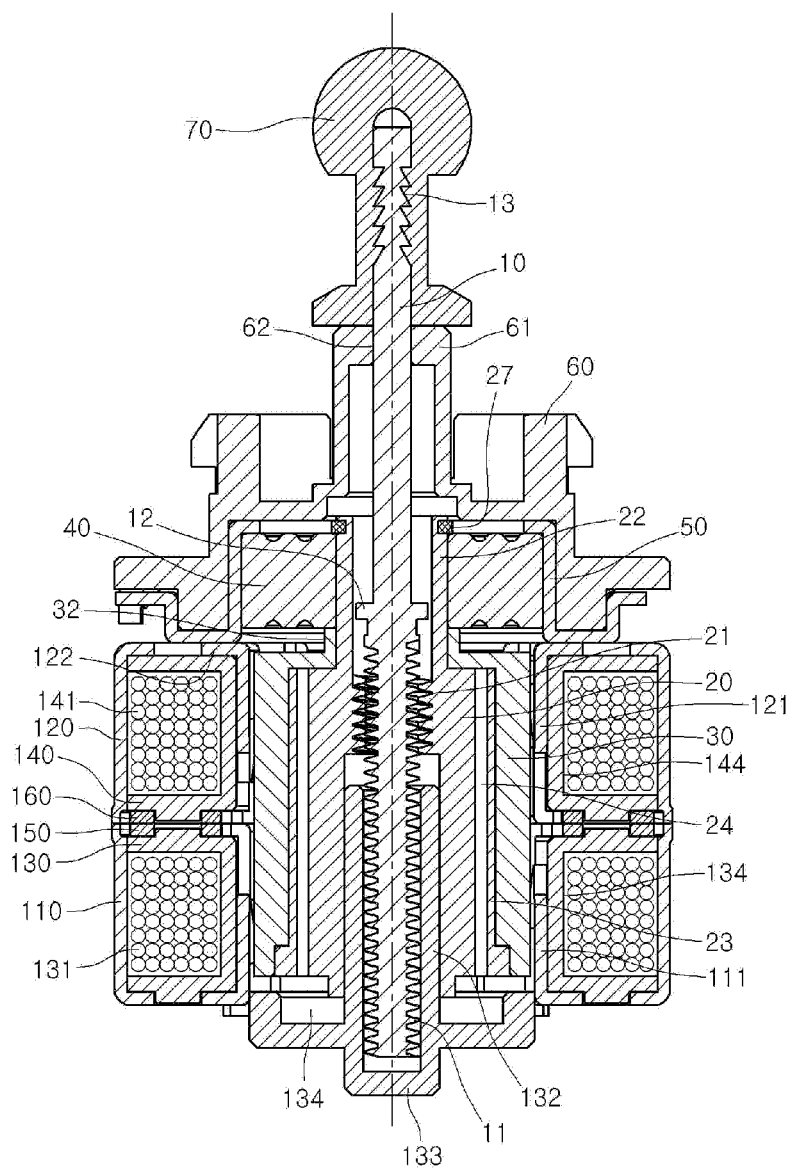
FIGS. 21 to 23 are views showing the coupling structure of a rotor and a bearing in a step actuator according to a fifth embodiment.
Figure 22:
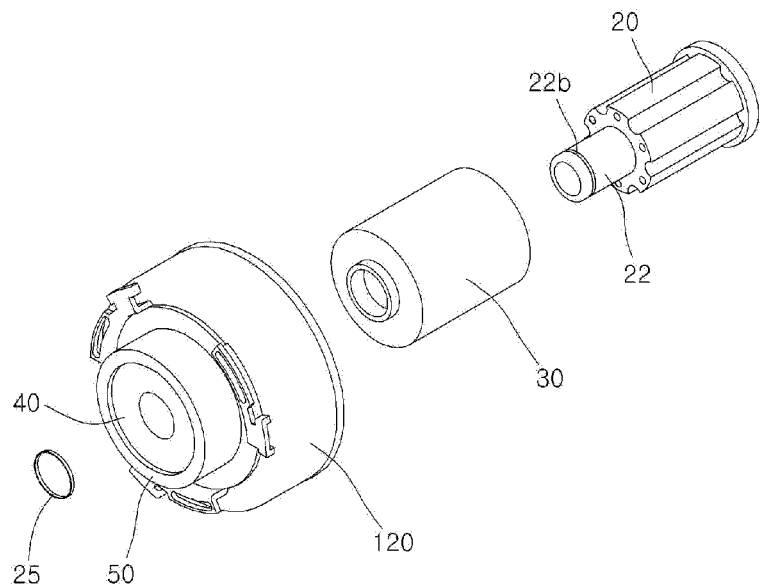

FIGS. 21 to 23 are views showing the coupling structure of a rotor and a bearing in a step actuator according to a fifth embodiment.

Referring to FIGS. 21 to 23, the coupling groove 22b is formed in the second end 22 of the nut member 20 in a circumferential direction of the second end 22. The bush 27 having a ring shape is provided at the second end of the bearing 40.

When the bearing 40, the magnet 30, and the nut member 20 are coupled with each other, the second end 22 of the nut member 20 protrudes through the bearing 40 in the second direction, and the coupling groove 22b of the nut member 20 is exposed in the second direction.

The bush 27 is inserted into the coupling groove 22b, and a caulking process is performed with respect to the bush 27, so that the coupling groove 22b is securely coupled with the bush 27. In other words, the bush 27 is coupled with the coupling groove 22b, and makes contact with the inner race of the bearing 40 at the side of the second direction.

Therefore, the bearing 40, the magnet 30, and the nut member 20 can be securely coupled with each other by the coupling groove 22b and the bush 27, and the bearing 40 can support the magnet 30 and the nut member 30 such that the magnet 30 and the nut member 20 can smoothly rotate.

FIG. 24 is a view showing the use of an elastic member in order to securely couple the rotor with the bearing in the step actuator according to the embodiments.

FIG. 24 shows a case in which first, second, third, and fourth elastic members 28a, 28b, 28c, and 28d are used in the coupling structure of the rotor and the bearing according to the second embodiment shown in FIGS. 11 to 14. However, the first to fourth elastic members 28a to 28d are applicable to other embodiments.

Referring to FIG. 24, the first elastic member 28a may be interposed between the snap ring 25 and the bearing 40, the second elastic member 28b may be interposed between the bearing 40 and the magnet 30, and the third and fourth elastic members 28c and 28d may be interposed between the magnet 30 and the nut member 20.

All of the first to fourth elastic members 28a, 28b 28c, and 28d may be applicable to the coupling structure of the rotor and the bearing, or only one of the first to fourth elastic members 28a, 28b 28c, and 28d may be applicable to the coupling structure of the rotor and the bearing according to applications. In other words, the locations and the number of the first to fourth elastic members 28a, 28b 28c, and 28d may be selectively determined.

The first to fourth elastic members 28a, 28b, 28c, and 28d provide elastic force in an axial direction. Accordingly, the bearing 40, the magnet 30, and the nut member 20 can be securely coupled with each other by the first to fourth elastic members 28a, 28b, 28c, and 28d, and the bearing 40 can support the magnet 30 and the nut member 30 such that the magnet 30 and the nut member 20 can smoothly rotate.

FIGS. 25 to 29 are views showing the structure and coupling relationship between the bearing cover and the mounting member.

Figure 25:
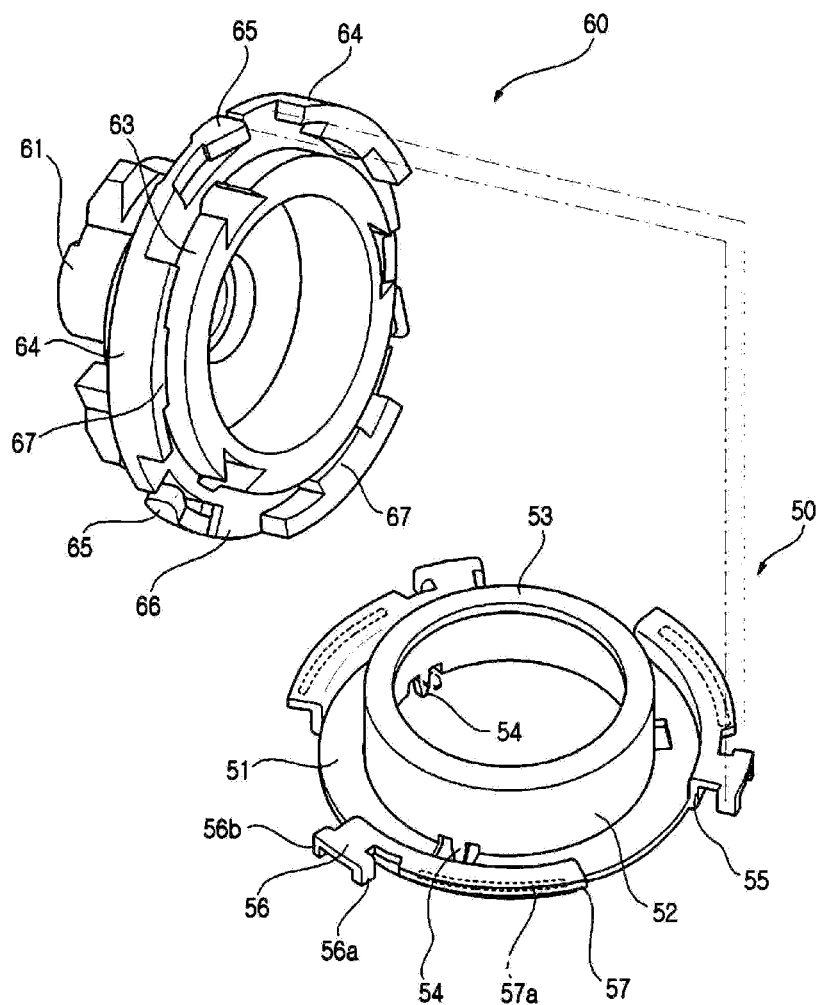
FIGS. 25 to 29 are views showing the structure and coupling relationship between the bearing cover and the mounting member.

Referring to FIG. 25, the bearing cover 50 includes a coupling rim 51, a coupling pipe 52, a locking rim 53, a support member 55, a stopper protrusion 56, and a first contact member 57.

The coupling rim 51 has a ring shape with a predetermined width and is coupled with the second rim portion 122 of the second housing 120. For instance, the coupling rim 51 is coupled with the second rim portion 122 of the second housing 120 through a welding process.

The coupling pipe 52 extends in the second direction from an inner peripheral surface of the coupling rim 51 such that an inner circumferential surface of the coupling pipe 52 makes contact with an outer race of the bearing 40.

The locking rim 53 protrudes radially inward of a second end of the coupling pipe 52 to make contact with the outer race of the bearing 40. The locking rim 53 restrains the movement of the bearing 40 in the second direction.

A plurality of support members 55 extend from an outer peripheral portion of the coupling rim 51 in the second direction while being spaced apart from each other. In this case, a virtual line connecting the support members 55 with each other may have a circular shape.

The stopper protrusion 56 extends radially outward from the support member 55. The stopper protrusion 56 includes first and second bending members 56a and 56b which are arranged in the circumferential direction. The first and second bending members 56a and 56b are supported on a locking member 64 and the locking protrusion 65 of the mounting member 60 such that the mounting member 60 can be prevented from rotating in the circumferential direction when the mounting member 60 is coupled with the bearing cover 50.

The first and second bending members 56a and 56b may enlarge the contact area of the stopper protrusion 56, so that the stopper protrusion 56 can be securely supported on the locking member 64 and the locking protrusion 65.

The first contact member 57 extends radially outward from the second end of the support member 55 and makes contact with the second contact member 67 of the mounting member 60 to prevent the mounting member 60 from moving in the axial direction.

The mounting member 60 includes the protrusion 61, a receptacle pipe 63, the locking member 64, the locking protrusion 65, an extension rim 66, and the second contact member 67.

The protrusion 61 and the receptacle pipe 63 constitute a body of the mounting member 60. The protrusion 61 supports the screw member 10 such that the screw member 10 can move in the first or second direction, and the receptacle pipe 63 provides a space for installing the bearing 40 and the bearing cover 50 therein. The protrusion 61 protrudes from the receptacle pipe 63 in the second direction.

The first end of the receptacle pipe 63 is inserted between the support member 55 of the bearing cover 50 and the coupling pipe 52. Accordingly, an outer peripheral portion of the first end of the receptacle pipe 63 makes contact with an inner peripheral portion of the support member 55 and an inner peripheral portion of the first end of the receptacle pipe 63 makes contact with an outer peripheral portion of the coupling pipe 52.

The extension rim 66 extends radially outward from an outer peripheral surface of the receptacle pipe 63 while forming a ring shape. The extension rim 66 faces the first stopper protrusion 56 and the first contact member 57 of the bearing cover 50.

A plurality of locking members 64 extend from the outer peripheral portion of the extension rim 566 in the first direction while being spaced apart from each other. An inner peripheral portion of the locking member 64 faces an outer peripheral portion of the coupling rim 51.

When the mounting member 60 rotates clockwise in a state that the locking member 64 is positioned between the support members 55 of the bearing cover 50, the first bending member 56a makes contact with the circumferential end of the locking member 64. Accordingly, the mounting member 60 does not rotate clockwise any more.

The locking protrusion 65 has elasticity and is formed on the extension rim 66 between the locking members 64. The locking protrusion 65 has a shape of a cantilever having a free end making contact with the second bending member 56b of the stopper protrusion 56.

In other words, the locking protrusion 65 is positioned between adjacent support members 55, and then is locked with the second bending member 56b of the stopper protrusion 56 while moving along the stopper protrusion 56 as the mounting member 60 rotates clockwise. Accordingly, the mounting member 60 does not rotate counterclockwise any more.

The free end of the locking protrusion 65 is inclined such that the locking protrusion 65 smoothly moves along the stopper protrusion 56.

The second contact member 67 extends radially inward of the first end of the locking member 64 while being spaced apart from the extension rim 66 at a predetermined distance. The first contact member 57 is inserted between the second contact member 67 and the extension rim 66.

The mounting member 60 is positioned at the side of the second direction of the bearing cover 50. Thus, when the mounting member 60 is coupled to the bearing cover 50, the second contact member 67, which is integrally formed with the mounting member 60, is positioned at the first end of the first contact member 57, which is integrally formed with the bearing cover 50, so that the movement of the mounting member 60 can be restrained in the first and second directions.

In order to securely couple the bearing cover 50 with the mounting member 60, an embossing 57a is formed on the first contact member 57 that makes contact with the second contact member 67. The embossing 57a closely adheres to the second contact member 67 when the locking member 64 and the locking protrusion 67 are locked with the stopper protrusion 56 due to the rotation of the mounting member 60, thereby supporting the second contact member 67 at the side of the first direction.

Hereinafter, the method for coupling the mounting member 60 with the bearing cover 50 will be described with reference to FIGS. 26 to 29.

Figure 26:
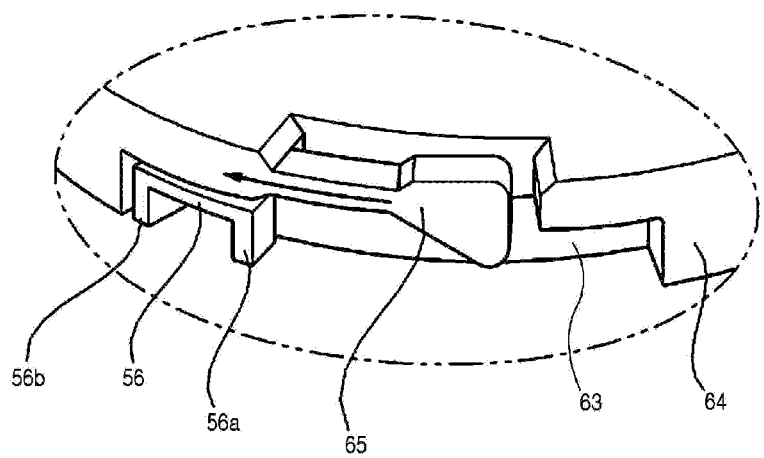

As shown in FIG. 26, the receptacle pipe 63 of the mounting member 60 is inserted between the support member 55 and the coupling pipe 52 of the bearing cover 50, and the locking member 64 and the locking protrusion 65 of the mounting member 60 are positioned between the stopper protrusions 56 of the bearing cover 50.

Figure 27:
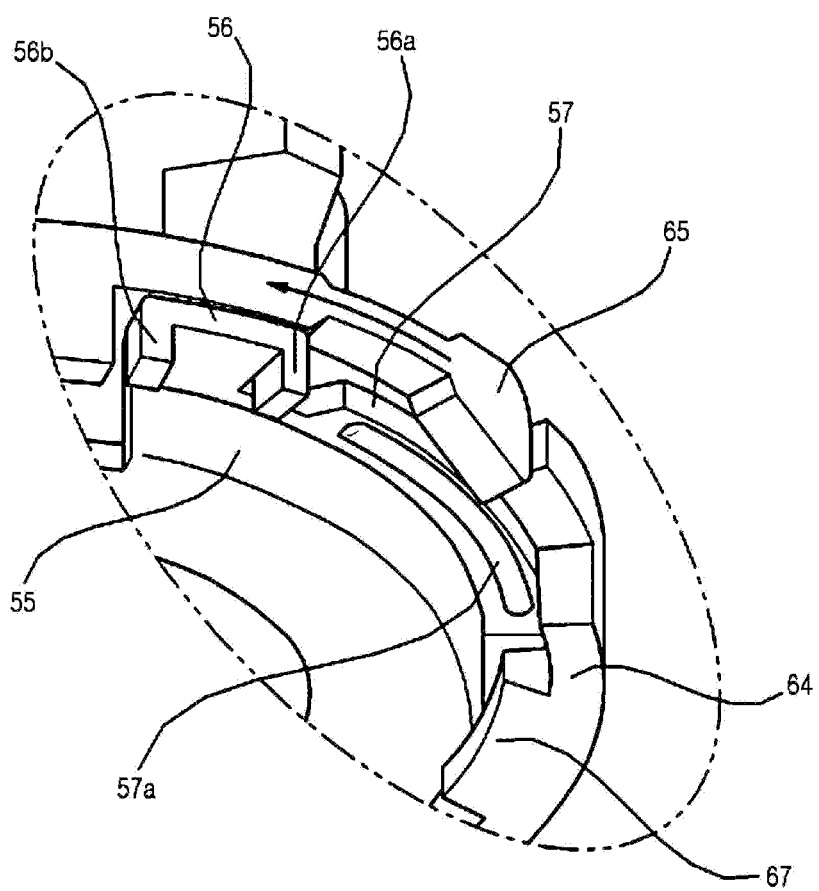

Differently from FIG. 27, the first contact member 57 of the bearing cover 50 does not overlap with the second contact member 67 of the mounting member 60 in the axial direction in FIG. 26.

Figure 28:
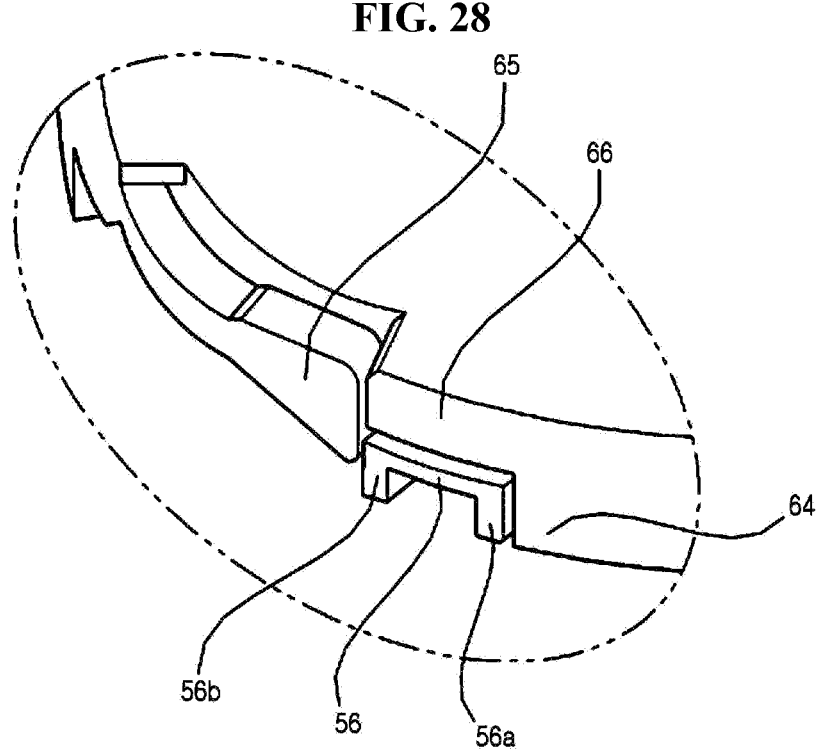

Referring to FIGS. 26 and 27, if the mounting member 60 rotates clockwise, as shown in FIG. 28, the locking member 64 makes contact with the first bending member 56a, and the locking protrusion 65 moves along the stopper protrusion 56 so that the free end of the locking protrusion 65 makes contact with the second bending member 56b. Accordingly, the mounting member 60 is not rotated.

Figure 29:
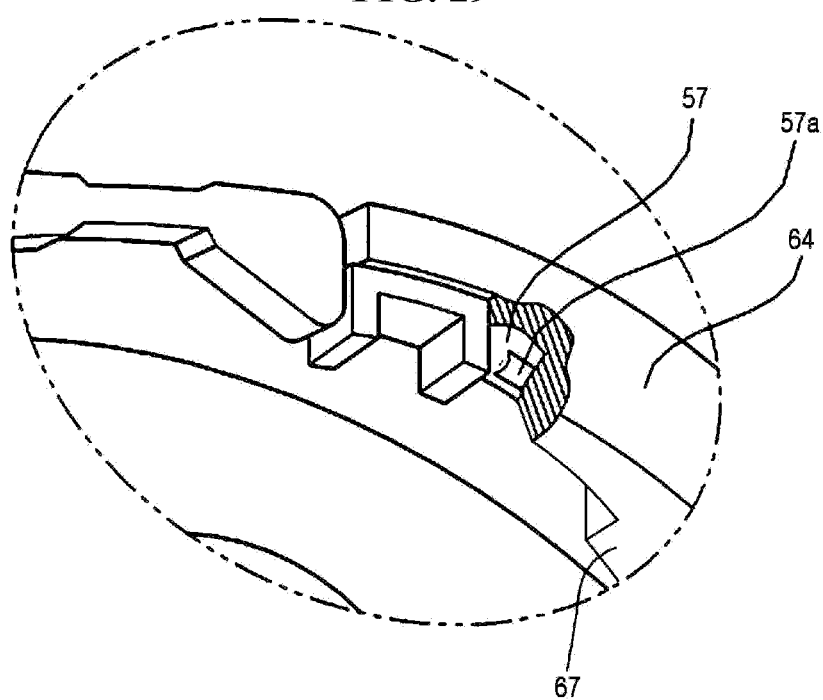

Similar to FIG. 29, the first contact member 57 of the bearing cover 50 overlaps with the second contact member 67 of the mounting member 60 in the axial direction in FIG. 28. Accordingly, the first contact member 57 makes contact with the second contact member 67. However, since the embossing 57a is formed on the first contact member 57, the embossing 57a closely adheres to the second contact member 67 to support the second contact member 67 while pushing the second contact member 67 in the first direction. Therefore, the bearing cover 50 can be securely coupled with the mounting member 60 without moving in the axial direction.

The mounting member 60 can be easily disassembled by rotating the mounting member 60 counterclockwise after lifting up the free end of the locking protrusion 165 in the second direction.

The step actuator according to the embodiment includes the bearing cover 50, which restrains the position of the bearing 40 and supports the mounting member 60, and the mounting member 60, which guides and supports the linear movement of the screw member 10. Thus, the mounting member 60 can be manufactured in various shapes and easily coupled with the bearing cover 50.

In the step actuator described above, an electric field is generated as power is applied to the first terminal portion 135 and the second terminal portion 145, so that the magnet 30 rotates in the forward or reverse direction according to the electric field.

As the magnet 30 rotates, the nut member 20 coupled with the magnet 30 also rotates, so that the screw member 10 having the thread 11 engaged with the thread of the nut member 20 moves in the first direction or the second direction according to the rotation direction of the magnet 30.

Although embodiments have been described with reference to a number of illustrative embodiments thereof, it should be understood that numerous other modifications and embodiments can be devised by those skilled in the art that will fall within the spirit and scope of the principles of this disclosure. Industrial Applicability

INDUSTRIAL APPLICABILITY

The embodiment is applicable to step actuators.

What is claimed is:

1. A step actuator comprising:
   first and second housings;
   a stator including first and second bobbins and first and second yokes;
   a rotor including a magnet and a nut member;
   a bearing rotatably supporting the nut member;
   a screw member coupled with the nut member to linearly move as the rotor rotates;
   a bearing cover coupled with the second housing; and
   a mounting member disposed on the bearing cover to support the screw member in such a manner that the screw member is linearly movable,
   wherein the magnet includes a spline hole provided at an inner peripheral surface thereof, and
   wherein the nut member includes a spline provided at an outer peripheral surface thereof and coupled with the spline hole formed in the magnet.

2. The step actuator of claim 1, wherein a surface of the spline hole is curved, and
   wherein a surface of the spline is curved.

3. The step actuator of claim 1, wherein the first bobbin is facing the magnet and the nut member further includes a recess.

4. The step actuator of claim 3, wherein the recess is recessed in a first direction.

5. The step actuator of claim 1, wherein the first bobbin includes a blocking portion to restrain the movement of the screw member in a first direction.

6. The step actuator of claim 1, wherein the nut member partially overlaps with the magnet in a circumferential direction where the spline and the spline hole are present.

* * * * *